United States Patent [19]

Porter et al.

[11] Patent Number: 4,521,669
[45] Date of Patent: Jun. 4, 1985

[54] TUBE-WELDING AUXILIARY

[76] Inventors: Michael R. Porter, R.R. 2, Box 282A, Terre Haute, Ind. 47802; Ross W. Elliott, R.R. 17, Box 316, Brazil, Ind. 47834

[21] Appl. No.: 473,528

[22] Filed: Mar. 9, 1983

[51] Int. Cl.³ .............................................. B23K 9/28
[52] U.S. Cl. .............................. 219/125.11; 219/60 R
[58] Field of Search .............. 219/60 R, 60 A, 125.11, 219/125.1, 158, 161

[56] References Cited

U.S. PATENT DOCUMENTS 3,805,011  4/1974  Knaefel et al. ................... 219/60 A
4,132,338  1/1979  Bove et al. ................. 219/125.11 X
4,366,363  12/1982  Wilson ...................... 219/125.11 X Primary Examiner—Roy N. Envall, Jr.
Assistant Examiner—Catherine M. Sigda
Attorney, Agent, or Firm—Robert A. Spray

[57] ABSTRACT

A welding device which provides a sort of a template function for guiding the electrode and tig torch of a gas tungsten arc welding procedure, the device providing a smooth and conical guide surface for the template-effect of an adjustable-radius guide surface, each circular portion of which is concentric about the axis (axes) of the tube(s) to be welded.

4 Claims, 1 Drawing Figure

U.S. Patent  Jun. 4, 1985  4,521,669
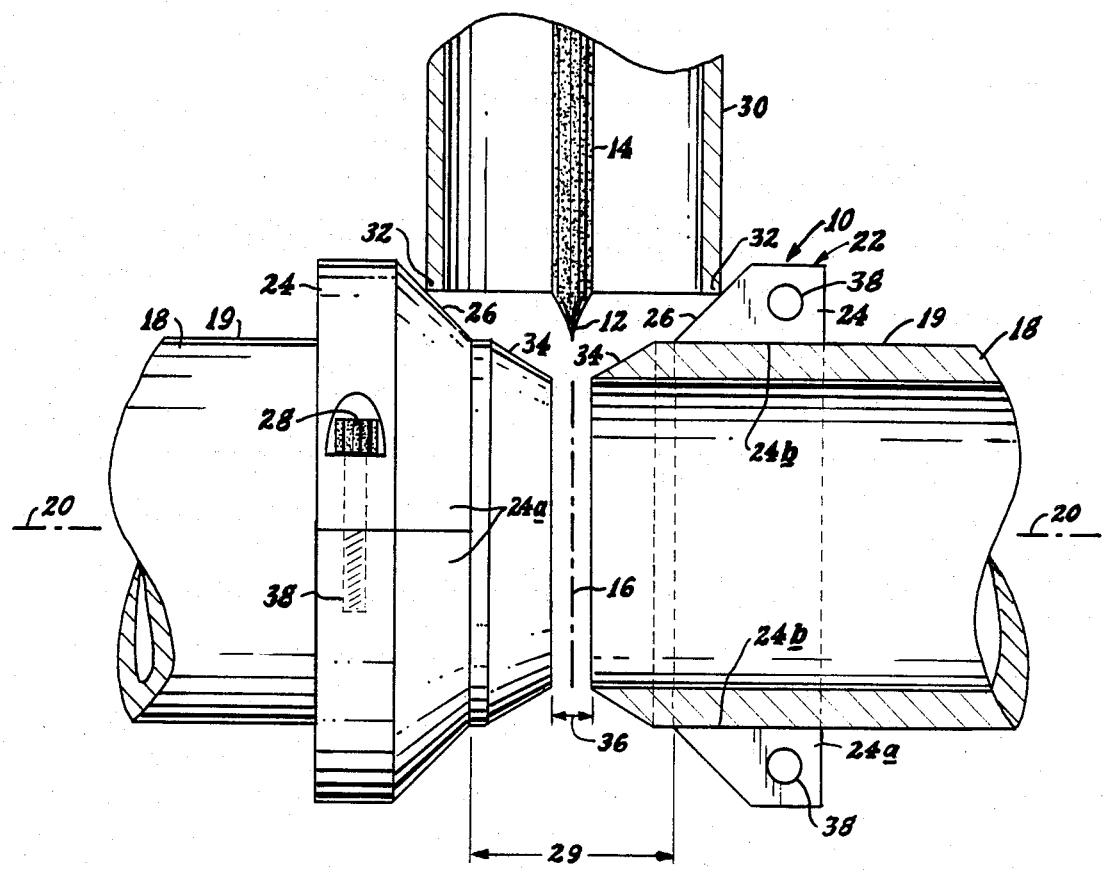

TUBE-WELDING AUXILIARY

The present invention relates to a welding device, particularly useful in arc welding procedures.

More specifically, the invention provides a sort of a template device for making easier the procedure of a manually-achieved gas tungsten arc welding process, in which a tig (from the words "tungsten inert gas") torch heats a pointed electrode and the work, often tubular stock, for achieving a weld.

This type of welding, i.e., gas tungsten arc welding, has been in use for several years; and if very skillfully done, it produces fine results. For the welding of tubular stock, however, which is generally and presumably always a hand operation, it has remained difficult to achieve the precision, water-tightness, strength, and other characteristics of a high-quality weld, especially in certain situations such as thin-wall tubing, irregular end cuts or beveling, etc.

Thus, gas tungsten arc welding has come through two stages, and with an attempt to provide proper care, uniformity, and other handling of the tig torch to achieve the high-quality finished weld which is the desired goal.

First, when the gas tungsten arc welding process was first introduced, the method for the manipulation of the tig torch was wholly freehand. This involved a lot of skill and manual dexterity to produce quality welds with acceptable appearance; and the factors of weld quality, scrap, labor time, etc., demanded improvement.

Second, as gas tungsten arc welding became more widely accepted, a method known as "walking the cup" was introduced.

"Walking the cup" is a phrase used to designate that second (although still requiring much manual dexterity for perfection) method used in the gas tungsten arc welding process. By this method, the cup or nozzle of the tig torch rests in the bevel of the pipe being welded, or on the weld itself, to help the welder hold a more stable arc and maintain the proper tungsten electrode angle, by providing a supportive surface. In using this method, the torch is rolled from side to side in such a way that the cup of the tig torch moves or "walks" up or along the weld joint.

"Walking the cup" improved the quality of the weld, for example, so much that it is the only manual gas tungsten arc welding process now recognized and used by the nuclear industry in the building of electric generating stations. It has apparently been very widely accepted, but it is still a difficult technique.

The present invention, accordingly, provides a device by which the known "walking the cup" is made much more uniformly, and easily accomplished, even by an operator who has never mastered the "walking the cup" method; and the factors of scrap, labor time, and especially high weld quality have been significantly improved.

In carrying out the invention, there are provided template-like clamps which clamp onto the tubing to be welded; and these clamp or clamp-like members act as an extension of the bevel on the tubing being welded, thus making it easier for the welder to "walk the cup" on thin wall thickness pipe, rather than attempting a "walking the cup" technique on a rough surface like the weld.

The template-like clamps of this invention not only provide the functional effects of a smooth surface to "walk the cup", but they also elevate the tig torch directly above the area to be welded, thus helping to maintain the proper arc length while maintaining the proper electrode angle.

Further finished-product advantages are derived by the clamps and the functional effects which they achieve.

As an overall effect of the completed weld, there is an improved and uniformly-good general weld appearance, a factor of quality workmanship desired not only for its own sake but because it usually means better strength and watertightness of the weld.

Also there is achieved a better shielding or gas coverage, significant because the quality of weldments produced by the gas tungsten arc welding process is significantly affected by gas coverage. With the use of the clamps, the advantage of better gas coverage in turn provides easier arc starting, smoother arc action, better cleansing action, and more resistance to draft.

Tests have shown it is possible to achieve higher welding speeds, yet still avoid such undesirable conditions as excessive spatter, shallow penetration, poor cleaning, and high gas consumption.

A more particular advantage of the present invention relates to the factor of the heat-affected zone. Heat-affected zone has been defined as, "That portion of the base metal which has not been melted, but whose mechanical properties or microstructure have been altered by the heat of welding."

Metallurgically, heat input can be critical, as having significant heat affect to the work. On many applications it is desired to keep the heat input as low as possible. With the use of the clamps, their size and mass and proximity to the weld path causes heat to be drawn from the base material into the clamps which reduces the size of the heat affected zone and thus also reduces the chance of carbide precipitation.

In general, the use of the cup-walking clamps will produce less actual welding time, a lower weld rejection rate, better general weld appearance, and better quality welds considering the various factors of strength and watertightness as well as a more uniform and attractive appearance.

The above description is of somewhat introductory and generalized form. More particular details, concepts, and features are set forth in the following and more detailed description of an illustrative embodiment, taken in conjunction with the accompanying drawings, which are of somewhat schematic and diagrammatic nature, and in which:

The only FIGURE of drawings is an elevational view, partly in cross-section, illustrating the tube-welding auxiliary shown as two separate components respectively mounted onto tubing-ends to be welded, and showing an electrode and its holder cup being guided thereby to perform the welding procedure.

As shown in the drawings, the inventive concepts provide a novel and advantageous tube-welding auxiliary 10 for supportingly guiding the operating point 12 of an associated electrode 14 over and along a circular work-path 16 of a tube means 18 to be welded. The weld-path 16 shown here is the common one, circumferentially of the wall 19 of the tube 18 and in a plane perpendicular to the axis 20 of the associated tube means 18.

As shown in the drawing, the auxiliary 10 comprises a guide body means 22, the guide body means 22 being shown as a pair of collars or sleeve-like circular members 24 each shown as being provided with a circular wall means 26.

There are shown securing means 28 for securing each of the circular members 24 of the guide body means 22 to the associated tube 18, and it is to be noted that the circular wall means 26 of each circular body member 24 of the guide body means 22 is concentric with the axis 20 of the tube 18 but is axially spaced from the weld's work-path 16.

The beveled or conical nature of the guide-walls 26, and there being one on each of the ring bodies 24, and an adjustability of the electrode 14 axially of the cup 30, and the relative movability 29 of both the ring bodies 24, provides considerable adjustability of the electrode 14 and its tip 12 radially of the tube 18 and of its axis 20.

The adjustability of the spacing 29 between the guide body members 24, and the conical nature of the walls 26, thus provide easy adjustability of the electrode 14; and each circular portion of the guide walls 26 provides a circular guide surface concentric with the axis (axes) 20 of the tube(s) 18.

The electrode 12 is shown as being of a form provided with a means 30, a portion of which provides an abutment means 32 which is fixed with respect to the operating point 12 of the associated electrode 14. (The tig torch, assembled with the electrode 14 and the cup 30, is not shown.)

Thus, in use in achieving a weld, the user imparts a relative rotation of the assembly of the secured tube 18 and guide body means 22, and of the interconnected electrode 14 and its means 30, and with the abutment means 32 of the electrode means 30 engaging the circular wall means 26 of each ring body 24 of the guide body means 22; and this causes the operating point 12 of the electrode 14 to relatively move over the surface 19 of the tube 18 over and along the path 16, achieving the desired operativity in the tube-welding procedure, producing a very uniform weld.

(The support and rotation-causing mechanism for the tubes 18 and the cup 30 is not shown, for they form no part of the inventive concepts.)

It will be particularly noted that the relative movement of electrode 14 and tube 18 is wholly guided by the relatively movable engagement of the holder's abutment means 32 and the circular wall means 26 of the rings 24 of the guide body means 22 independently of the relative position of the operating point 12 of the electrode 14 and the surface of the tube 18.

For desired fullness of weld penetration, the tube 18 surface along the weld path 16 is shown as beveled off by bevel 34 and with the portions of the tube 18 on each side of the weld path 16 pulled apart leaving a space 36 therebetween; but the advantages of the concepts are that the proper guiding of the electrode point 12 is also wholly independent of such factors of accuracy and uniformity of beveling of the bevels 34 and the amount of spacing 36 and even whether there is any spacing 36 at all.

In the form shown, each of the collar members 24 is provided in the form of a semi-circular open ring 24a the internal edge 24b of which just seats onto the outer wall 19 of the respective tube-portion 18; and the two bodies 24a of each collar 24 are connected to one another and to the tube-portions 18 by a securing screw 28 which is threaded into a threaded opening 38 in one of the collar-portions 24a.

It is thus seen that a tube-welding auxiliary according to the inventive concepts provides a desired and advantageous device, yielding the effectiveness of a sort of template by which gas tungsten arc welding of tubular stock may be done in a guided manner which achieves both economy and better quality of the weld, as herein described.

Accordingly, it will thus be seen from the foregoing description of the invention according to this illustrative embodiment, considered with the accompanying drawings, that the present invention provides new and useful concepts of a tube-welding auxiliary, particularly for gas tungsten arc welding, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A gas tungsten arc welding auxiliary, for use with an electrode having a body portion and an operating point, for supportingly guiding the operating point of the associated electrode of an assembly of electrode, tig torch, and cup, such that the operating point of the electrode is guided over and along a circular work-path of a tube means to be welded by a weld achieved by the operative function of the electrode, tig torch, filler wire, and tube means as a work object, as the tube means and the assembly are relatively rotated about the axis of the tube means, comprising:

a guide body means;

securing means for securing the guide body means to the associated tube means;

the guide body means providing a circular supporting path concentric with the axis of the tube means but spaced axially from the work-path of the weld;

the circular supporting path thereby providing a template-type guide for the operating point of the electrode as the cup is held against the supporting path during relative rotation of the assembly and the tube means, guiding the operating point of the electrode with respect to the tube means and to the work-path thereof, as the said relative rotation causes the relative movement of the assembly and tube means;

in a combination in which the guide body means, and the securing means for securing the guide body means to the associated tube means, comprise a pair of collar members each having a pair of semi-circular open ring bodies whose inner edges seat onto the outer wall of the respective tube-portion, and the two semi-circular ring bodies of each collar member are provided with securing means for securing each respective pair together and securely gripping the respective tube-portion at a selected axial setting to establish the desired weld work-path even though the outer wall of both of the tube-portions is cylindrical and without any axial locator means;

in a combination in which the collar members have a conical surface whose axis is concentric with the axis of the tube means, and provide both a guide of the cup and electrode axially of the associated tube means but also to provide a guide for the cup and electrode so as to be at the desired radial distance from the associated tube means.

2. A gas tungsten arc welding auxilliary, for use with an electrode having a body portion and an operating point, for supportingly guiding the operating point of the associated electrode of an assembly of electrode, tig torch, and cup, such that the operating point of the electrode is guided over and along a circular work-path of a tube means to be welded by a weld achieved by the operative function of the electrode, tig torch, filler wire, and tube means as a work object, as the tube means and the assembly are relatively rotated about the axis of the tube means, comprising:

a guide body means;

securing means for securing the guide body means to the associated tube means;

the guide body means providing a circular supporting path concentric with the axis of the tube means but spaced axially from the work-path of the weld;

the circular supporting path thereby providing a template-type guide for the operating point of the electrode as the cup is held against the supporting path during relative rotation of the assembly and the tube means, guiding the operating point of the electrode with respect to the tube means and to the work-path thereof, as the said relative rotation causes the relative movement of the assembly and tube means;

in a combination in which the guide body means has a conical surface whose axis is concentric with the axis of the tube means, the conical surface providing both a guide of the cup and electrode axially of the associated tube means but also to provide a guide for the cup and electrode so as to be at the desired radial distance from the associated tube means.

3. The invention as set forth in claim 3, in a combination in which the collar members are provided on opposite sides of the weld work-path, with the taper of their surfaces radially outwardly of the tube means being axially away from the weld work-path.

4. The invention as set forth in claim 6, in a combination in which the guide body means are provided by components which are provided on opposite sides of the weld work-path, with the taper of their surfaces radially outwardly of the tube means being axially away from the weld work-path.

* * * * *

UNITED STATES PATENT AND TRADEMARK OFFICE
CERTIFICATE OF CORRECTION

PATENT NO. : 4,521,669
DATED : June 4, 1985
INVENTOR(S) : Michael R. Porter and Ross W. Elliott It is certified that error appears in the above-identified patent and that said Letters Patent are hereby corrected as shown below:

Col 6, line 12: (being line 1 of Claim 3), change the number "3" (the 2nd occurrance thereof in the line) to: -- 1 --.

Col 6, line 17: (being line 1 of Claim 4), change the number "6" to: -- 2 --.

Signed and Sealed this

Twenty-seventh Day of August 1985

[SEAL]

Attest:

DONALD J. QUIGG

Attesting Officer          Acting Commissioner of Patents and Trademarks